(12) United States Patent
Reisch et al.

(10) Patent No.: US 8,245,828 B2
(45) Date of Patent: Aug. 21, 2012

(54) DEVICE OF A ROTATIONALLY FIXEDLY CONNECTING A SHAFT TO A COMPONENT WHICH IS ROTATABLY MOUNTED ON THE SHAFT

(75) Inventors: Matthias Reisch, Ravensburg (DE); Mark Mohr, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 658 days.

(21) Appl. No.: 12/445,401

(22) PCT Filed: Oct. 2, 2007

(86) PCT No.: PCT/EP2007/060458
§ 371 (c)(1),
(2), (4) Date: Apr. 13, 2009

(87) PCT Pub. No.: WO2008/046738
PCT Pub. Date: Apr. 24, 2008

(65) Prior Publication Data
US 2010/0051405 A1 Mar. 4, 2010

(30) Foreign Application Priority Data
Oct. 19, 2006 (DE) .......................... 10 2006 049 276

(51) Int. Cl.
*F16D 23/06* (2006.01)
(52) U.S. Cl. .............. 192/53.31; 192/48.91; 192/53.361
(58) Field of Classification Search ............ 192/53.361, 192/53.31, 48.91, 48.9, 54.5, 66.23, 66.2, 192/96
See application file for complete search history.

(56) References Cited

U.S. PATENT DOCUMENTS

| 160,570 | A | * | 3/1875 | Carver | 192/82 R |
| 824,805 | A | * | 7/1906 | Muller | 192/35 |
| 1,292,691 | A | * | 1/1919 | Bowles | 192/66.23 |
| 2,874,817 | A | * | 2/1959 | Altmann | 192/114 T |
| 2,978,083 | A | * | 4/1961 | Henyon | 192/114 R |
| 3,249,188 | A | * | 5/1966 | Maina | 192/69.9 |
| 3,370,681 | A | * | 2/1968 | Humphrey | 192/66.3 |

(Continued)

FOREIGN PATENT DOCUMENTS

CA 2 451 899 A1 6/2004

(Continued)

*Primary Examiner* — David D Le
*Assistant Examiner* — Lillian Nguyen
(74) *Attorney, Agent, or Firm* — Davis & Bujold, P.L.L.C.

(57) ABSTRACT

A device for rotationally fixing a shaft to a component that is rotatably arranged on the shaft. The actuating element positively engages the components to rotationally fix the components to the shaft. The difference in rotational speeds, between the component and the shaft, can be at least approximately compensated for by the actuating element. The actuating element, for rotationally fixing the component to the shaft by the actuator, is operatively connected to at least one support body, which is rotationally fixed with respect to the shaft in such a manner that the actuating element can act upon the component with an actuating force that depends on the torque to be transmitted from the shaft to the component and which is independent of the actuation of the actuator in the state in which the actuating element can be rotated relative to the shaft.

7 Claims, 2 Drawing Sheets

U.S. PATENT DOCUMENTS

| | | |
|---|---|---|
| 4,278,156 A | 7/1981 | Yano et al. |
| 4,428,249 A * | 1/1984 | Henk .................. 74/412 TA |
| 4,789,266 A | 12/1988 | Clarke, Jr. et al. |
| 4,789,366 A | 12/1988 | Hale et al. |
| 5,161,423 A * | 11/1992 | Ore ............................. 74/339 |
| 5,366,421 A | 11/1994 | Hirota |
| 6,035,984 A * | 3/2000 | Kosik et al. .................. 192/3.61 |
| 6,123,591 A | 9/2000 | Onoue |
| 6,520,305 B2 | 2/2003 | Dick |
| 6,886,673 B2 * | 5/2005 | Burger ........................ 192/53.4 |
| 2006/0037829 A1 * | 2/2006 | Buhlmaier et al. .......... 192/53.1 |
| 2009/0301243 A1 * | 12/2009 | Reisch et al. .................. 74/405 |

FOREIGN PATENT DOCUMENTS

| | | |
|---|---|---|
| DE | 29 43 142 A1 | 5/1980 |
| DE | 38 15 225 A1 | 11/1989 |
| DE | 102 17 576 A1 | 12/2002 |
| DE | 103 47 266 A1 | 5/2005 |
| EP | 0 492 836 A1 | 7/1992 |
| EP | 1 830 092 A1 | 9/2007 |
| WO | 2005/036007 A1 | 4/2005 |
| WO | 2005/119076 A1 | 12/2005 |

* cited by examiner

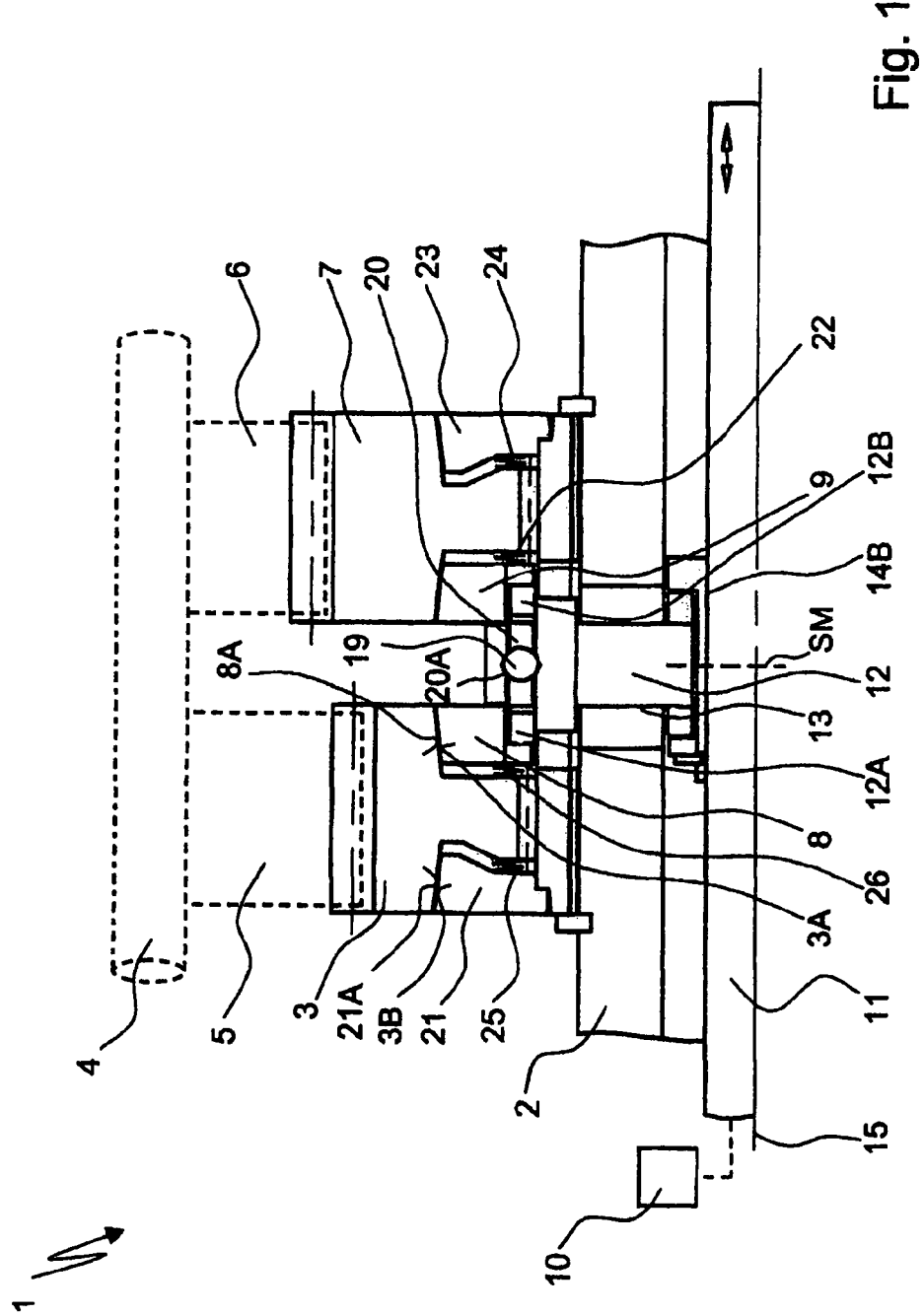

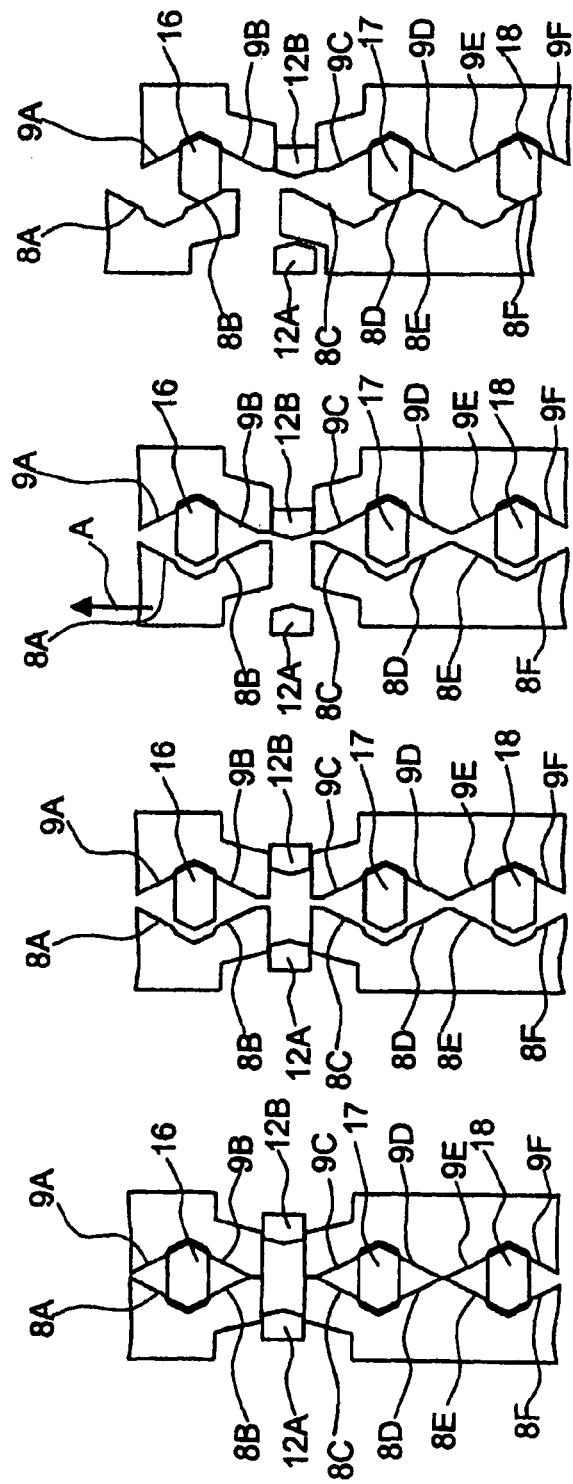

DEVICE OF A ROTATIONALLY FIXEDLY CONNECTING A SHAFT TO A COMPONENT WHICH IS ROTATABLY MOUNTED ON THE SHAFT

This application is a National Stage completion of PCT/EP2007/060458 filed Oct. 2, 2007, which claims priority from German patent application serial no. 10 2006 049 276.5 filed Oct. 19, 2006.

FIELD OF THE INVENTION

The invention relates to a device for rotationally fixing a shaft to a component rotationally mounted on the shaft.

BACKGROUND OF THE INVENTION

In transmission technology, gearwheels designed as loose wheels of various gear stages of a transmission device are connected in a rotationally fixed manner to a transmission shaft on which the loose wheels are arranged by means of so-called synchronization mechanisms. This means that when shifting a gear of a transmission device, differences in rotational speed between a loose wheel, that is to be connected, and a transmission shaft, assigned to this loose wheel, are compensated for by means of a frictionally engaging synchronization mechanism. When the loose wheel and the transmission shaft have reached the same speed, there is no more dynamic frictional torque, and so-called locking teeth release a claw of a synchronization mechanism in order to engage the desired gear in a positive-locking manner.

These kinds of synchronization mechanisms disadvantageously require an undesirably large amount of installation space due to their design, which incorporates friction elements, blocking devices, and claws, and are characterized by high manufacturing costs.

In addition to the synchronization mechanisms described above, there are transmission devices known from practice in which frictionally-engaged shifting elements of simple constructive design, such as plate-type shifting elements, are used to connect loose wheels. In order to keep shifting elements of that kind in an engaged state, they should generally be acted on in each case with a holding force equivalent to the engaged state of the shifting element, which is preferably hydraulically produced. However, this holding force, which has to be permanently applied, impairs the overall efficiency of a transmission device.

From CA 2 451 899 A1 is known a frictionally-engaged shifting element designed with so-called self-energization, which remains in an engaged state without a separately applied holding force due to an applied torque.

However, this has the disadvantage that the connection between a component rotatably mounted on a shaft and the shaft itself is produced in a positive-locking manner, so that coupling the component to the shaft is not problematic regarding the driving comfort when there are low rotational speed differences between the component, or, as the case may be, a loose wheel, and a shaft. If a connection, or, as the case may be, a rotationally fixed connection of the component to the shaft is necessary at high rotational speed differences between the component and the shaft, the positive-locking connection between the shaft and the component to be established through self-energizing, can lead to an impulse exchange with high torque peaks due to very brief response times, which results in an impairment of the driving comfort and undesirably high component stress.

SUMMARY OF THE INVENTION

It is therefore an object of the invention to make available a device for connecting a shaft in a rotationally fixed manner to a component rotatably mounted on the shaft, which is characterized by a low installation space requirement, can be cost-efficiently manufactured, and by means of which a high degree of driving comfort and simultaneously low component stress can be achieved.

With the device according to the invention for rotationally fixing a shaft to a component that is rotatably mounted on the shaft, preferably for connecting a gearwheel designed as a loose wheel of a gear stage of a transmission device to a transmission shaft with an actuating element displaceable in axial direction and rotatably mounted on the shaft, which can be rotationally fixed to the shaft via an actuator and which makes possible bringing the actuating element in operative connection with the component in a frictionally engaging manner in the rotationally fixed state by actuating the corresponding actuator, and with which a rotational speed difference between the component and the shaft can be at least approximately compensated for by means of the actuating element that can be actuated on the actuator side, the actuating element for rotationally fixing the component to the shaft by means of the actuator can be transferred from a rotationally fixed state into a state in which it can be rotated relative to the shaft and is operatively connected to at least one support body in such a way that the component, in the state in which the actuating element can be rotated relative to the shaft, can be acted on by the actuating element with an actuating force that is dependent on a torque to be transmitted from the shaft to the component, and which is independent of the actuation of the actuator.

In this way, a component that is rotationally fixed on a shaft can be connected to the shaft in a rotationally fixed manner by means of a shifting element designed with a self-energizing mechanism, wherein the rotationally fixed connection is established in two phases. During a first phase, a rotational speed difference between the component and the shaft is compensated for in a frictionally engaged manner, or, as the case may be, the component and the shaft are synchronized. During this first phase, the self-energizing mechanism is inactive, and a shifting force produced by an actuator is used to produce frictional torque between the existing actuating element, that is fixed to the shaft, and the component, in order to produce a state of synchronization between the component and the shaft.

During a second phase that follows the first phase, the self-energizing mechanism is activated by transferring the actuating element from a rotationally fixed state into a state in which it can be rotated relative to the shaft and is acted on by a contact force that is dependent on the torque to be transmitted from the shaft to the component and is independent from the actuation by the actuator of the actuating element. In this way, the component is rotationally fixed to the shaft without having to supply a holding force by the actuator when a predefined threshold value of the contact force is exceeded.

BRIEF DESCRIPTION OF THE DRAWINGS

Advantageous further developments of the object of the invention can be seen in the patent claims and the exemplary embodiments, which are described in principle with reference to the drawing.

In the drawings:

FIG. 1 shows a highly schematized partial longitudinal sectional view of a device according to the invention;

FIG. 2 shows a development drawing of an actuating element of the device according to FIG. 1 in neutral position:

FIG. 3 shows the actuating element of the device according to FIG. 1 in a representation corresponding to FIG. 2 during a synchronization phase;

FIG. 4 shows the actuating element of the device 1 according to FIG. 1 in a representation corresponding to FIG. 2 in a state in which it can be rotated relative to a shaft; and FIG. 5 shows the actuating element of the device according to the invention in a state in which it connects the component to the shaft in a rotationally fixed manner.

DETAILED DESCRIPTION OF THE PREFERRED EMBODIMENTS

FIG. 1 shows a device 1 for connecting a shaft 2 in a rotationally fixed manner to a component 3 rotatably mounted on the shaft 2, wherein the shaft 2 is designed as a countershaft of a countershaft transmission, on which the component 3 is arranged as a loose wheel.

As a variation of this, the device 1 can also be used in other transmission devices, such as automatic transmissions, double clutch transmissions, or planetary transmissions, as a synchronizing and shifting element for automatic actuation of a transmission device during gear shifting and the like.

A transmission main shaft 4, on which a plurality of gearwheels 5, 6 designed as fixed gears are arranged, is provided parallel to the countershaft 2, wherein the gearwheel 5 meshes with the loose wheel 3 and the toothed wheel 6 with an additional loose wheel 7 rotatably mounted on the countershaft 2.

The two loose wheels 3 and 7 can be actuated alternately by the device 1 in such a way that the loose wheels 3 and 7 can be transferred from a state in which they can be rotated on the countershaft 2 into a state in which they are rotationally fixed relative to the countershaft 2, or from a rotationally fixed state into a state in which they can be rotated relative to the countershaft 2, in order to transmit torque acting on the countershaft 2 via the first loose wheel 3 or the second loose wheel 7 and via the toothed wheel 5 or the toothed wheel 6, to the main transmission shaft 4.

For this purpose, the device 1 is designed with two rotatably and displaceably arranged on the countershaft 2 in axial direction actuating elements 8, 9, which can be rotationally fixed, via an actuator 10, to the countershaft 2 and can be brought into positive-locking interaction with the loose wheels 3 and 7 as a consequence of a corresponding actuation from the actuator side in the rotationally fixed state. Furthermore, a rotational difference between the loose wheels 3 and 7 and the countershaft 2 can be at least approximately compensated for by the actuating elements 8 and 9 respectively, which can be actuated by the actuator.

The actuator 10 is brought herein into operative interaction with the actuating elements 8 and 9 in the manner described below via an actuating rod 11 and via a plurality of holding elements 12 connected to the countershaft 2 and designed to be movable with respect to the countershaft 2, of which only one is shown in FIG. 1, in order to bring the actuating element 8 or the actuating element 9 into frictionally engaging contact with the loose wheel 3, or, as the case may be, the loose wheel 7.

In this case, the holding element 12 is designed so as to be axially movable in a long slot 13 in axial direction of the countershaft 2 from a middle switching position SM in direction of the first loose wheel 3, or in direction of the second loose wheel 7 and rotates during operation of the countershaft transmission at the rotational speed of the countershaft. The actuating rod 11 is configured in a rotationally fixed manner with respect to a housing of the countershaft, so that a rotational speed uncoupler shown in FIG. 1 is provided in the connecting area 14 between the actuating rod 11 and the holding element 12.

FIG. 2 to FIG. 5 show the actuating elements 8 and 9 of the device 1 according to FIG. 1 in the form of a development drawing during the various shifting phases of the device 1, starting with a state shown in FIG. 2, in which neither the first loose wheel 3 nor the second loose wheel 7 are connected in a rotationally fixed manner to the countershaft 2, up to a shifting state of the device 1 shown in FIG. 5, in which the first loose wheel 3 is rotationally fixed to the countershaft 2.

The actuating elements 8 and 9 are configured with a plurality of flanks 8A to 8F, or, as the case may be, 9A to 9F, which enclose an angle together with a cross sectional plane positioned vertical with respect to the axis of symmetry 15 of the countershaft 2, and interact with a support body 16 to 18 fixed to the countershaft 2 in the region of the mutually facing flanks 8A and 8B, 8C and 8D, as well as 8E and 8F, or, as the case may be, 9A and 9B, 9C and 9D, as well as 9E and 9F.

In this way, the actuating elements 8 and 9 are in operative connection with the support bodies 16 to 18, which are fixed to the countershaft, in such a way that the loose wheel 3 or the loose wheel 7 can be acted on by an actuating force subject to a torque that is transmitted from the countershaft 2 to the loose wheel 3 or the loose wheel 7, and which is independent of the actuation of the actuator, in a state where the actuating element 8 or the actuating element 9 of the actuation can be rotated in relation to the shaft.

In the neutral shifting state SM of the device 1 shown in FIG. 1 and FIG. 2, the holding element 12 is connected, via a region 12A, in a positive-locking manner to the actuating element 8, and connected with a region 12B in a positive-locking manner to the actuating element 9, so that both actuating elements 8 and 9 are rotationally fixed to the countershaft 2. Furthermore, the holding element 12 is connected, via a retaining element 19, to a sleeve-like ring element 20 in the region of its peripheral surface facing away from the axis of symmetry 15. The sleeve-like ring element 20 is arranged between the actuating elements 8 and 9 and can be brought into engagement with the plane surfaces of the actuating elements 8 and 9 facing the ring element 20 in the neutral shifting position SM of the device 1 shown in FIG. 1.

Starting from the neutral shifting position SM of the device 1 shown in FIG. 2, the holding element 12 is axially displaced toward the loose wheel 3 along the countershaft 2 with a corresponding actuation by the actuator. As that happens, the ring element 20 connected to the holding element 12 via the retaining element 19 is also moved in direction of the loose wheel 3, and comes to rest against the actuating element 8 after it overcomes a provided play, whereby the actuating element 8 arranged in axial direction of the countershaft 2 is likewise displaced thereon in the direction of the loose wheel 3.

With increasing shifting travel of the holding element 12, the actuation element 8 is displaced against a similarly conically designed friction surface 3A of the loose wheel 3 with a conical peripheral surface 8A. At the same time, the loose wheel 3 is axially moved along the countershaft 2 in the direction of a shaft collar 21, which is rotationally fixed the countershaft 2 and made to engage with an additional, conically designed friction surface 3B engaged with a conically designed friction surface 21A of the shaft collar 21.

The sleeve-like ring element 20 is designed herein with a predefined elasticity, whereby the retaining element 19 is arranged in the position shown in FIG. 1 between the ring element 20 and the holding element 12 by means of a predefined spring force. The predefined elasticity of the ring element 20 and the spring force that results therefrom and acts on the retaining element 19 correspond to an actuation force that acts on the actuating element 8 and is directed in the axial direction, with which a rotational speed difference between the countershaft 2 and the loose wheel 3, or, as the case may be, the countershaft 2 and the loose wheel 7, can be at least approximately compensated for in a frictionally engaging manner.

If an actuating force originating from the actuator 10 exceeds the spring force that holds the retaining element 19 in the position shown in FIG. 1 between the ring element 20 and the holding element 12, the ring element 20 is reversibly deformed in the radial direction of the countershaft 2, and the retaining element rolls out of the groove-shaped recess 20A of the ring element 20, thereby enabling relative movement between the actuation element 8 and the holding element 12, or, as the case may be, the region 12A of the of holding element 12.

This means that during a first shifting phase of the device 1, the actuation element 8, together with the holding element 12 is guided in the direction of the position shown in FIG. 3 starting from the position shown in FIG. 2 due to the actuation by the actuator, during which the holding element 12 connects the actuating element 8 in the region 12A in a rotationally fixed manner to the countershaft 2.

Only after the spring force of the ring element 20 is exceeded is it possible to have relative movement between the actuating element 8 and the holding element 12, or, as the case may be, the region 12A of the holding element 12, and for the region 12A to be guided out of the engagement with the actuating element 8 in the manner shown in FIG. 4, while the area 12B remains connected in a positive-locking manner with the actuating element 9.

This means that the actuating element 8 is rotatably and displaceably mounted in axial direction on the countershaft in the shifting state of the device 1 shown in FIG. 4, while the actuation element 9 is rotationally fixed to the countershaft 2 in the area 12B and is pressed by means of a first spring device 22, arranged between the loose wheel 7 and the actuation element 9, against the ring element 20. Between the loose wheel 7 and an additional shaft collar 23 is furthermore provided a second spring device 24, which guides the loose wheel 7 in non-actuated state out of engagement with the additional shaft collar 23.

A third spring device 25 and a fourth spring device 26, respectively, are provided, in addition, between the shaft collar 21 and the loose wheel 3, as well as between the loose wheel 3 and the actuation element 8, in order to guide the loose wheel 3 with the corresponding shifting position of the device 1 out of engagement with the shaft collar 21 and the actuation element 8.

If the shifting state of the device 1 shown in FIG. 4 is present, in which the actuation element 8 is frictionally engaged with the friction surface 3A of the loose wheel 3 with its friction surface 8A, the actuation element 8 will be twisted in direction of the arrow A shown in FIG. 4 subject to a torque to be transmitted from the countershaft 2 to the loose wheel 3. The actuating element 8 comes then to rest against the supporting bodies 16 to 18 in the region of its flanks 8B, 8D, and 8F and experiences an additional axial displacement in the direction of the loose wheel 3, or, as the case may be, the shaft collar 21 depending on its torsion, whereby an actuating force acting on the loose wheel 3 increases without additional actuation of the actuating element 8 by the actuator, and the loose wheel 3 is rotationally fixed to the countershaft 2 depending on the torque to be transmitted. This shifting state of the device 1 is shown in FIG. 5.

The loose wheel 7 can be rotationally fixed to the countershaft 2 by means of the device 1, analogously to the previously described manner, by means of actuation by the actuator of the holding element 12, starting from the neutral shifting position SM in the direction of the loose wheel 7 when there is a demand to engage the gear stage corresponding to the gear pairing between the loose wheel 7 and the gearwheel 6.

In the exemplary embodiment of the device according to the invention shown in the drawing, the actuation force required for the synchronization of the loose wheels 3, 7 and the countershaft 2 and the release of the self-energization of the device 1 is realized by means of the actuator 10, which makes available the actuation force electromechanically, pneumatically, or magnetically.

In order to detect a state of synchronization between the loose wheel 3, or, as the case may be, the loose wheel 7 and the countershaft 2, the device 1 is provided with a control device, which is not shown in more detail. Using this device, it is possible to determine in advance a point in time at which the state of synchronization is achieved by monitoring the current operating state of the loose wheels 3 and 7 as well as the countershaft.

As an alternative to the exemplary embodiment of the device 1 shown in FIG. 2 to FIG. 5, in which the actuating force in the region between the support bodies 16 and 18 and the actuating elements 8 and 9 is transmitted in the form of a slide bearing, it is provided in an execution example of the device according to the invention which is not shown in more detail that the actuation force in this region is transmitted by antifriction bearings.

As an alternative to the axial displacement of the holding element 12 of the device 1, it is provided in additional embodiments, which are not shown in more detail in the drawing, that the rotationally fixed connection of the actuating elements 8 and 9 to the countershaft 2 can be disconnected through radial movement or twisting of the regions 12A and 12B of the holding element 12, and that the self-energization of the device 1 can be released to the desired extent.

Furthermore, it is provided in additional exemplary embodiments of the device according to the invention, which are also not shown in more detail in the drawing, that the friction surfaces between the loose wheels and the actuation elements, as well as between the loose wheels and the shaft collars, are designed as cylindrical or as planar surfaces as an alternative to the conical design, wherein the last-mentioned embodiment with planar surfaces is characterized by shorter adjustment paths in comparison with the conical design of the friction surfaces.

As a deviation from the actuation of the actuating elements of the device according to the invention from the inside of the shaft, or, as the case may be, the countershaft, the actuating elements can also be actuated in the previously described manner from the outside in relation to the surface of the shaft in additional advantageous embodiments of the device according to the invention, for example, by means of selector forks or the like, in order to adapt a rotational speed of the component to be connected in a rotationally fixed manner to the a shaft to the rotational speed of the shaft and to then connect the two elements in a rotationally fixed manner.

The device according to the invention is characterized in principle by a compact construction, and driving comfort is improved in a simple and cost-efficient manner due to the purely frictionally engaged design in comparison with the synchronization mechanisms configured with claws.

A loose wheel, which is only affected by significant tilt torques in an engaged state, that is, in a state where torque is transmitted, is supported in addition in an engaged state by an actuation element and a shaft collar and is configured with a more rigid mounting base than in a disengaged state. In this way, the development of noise during operation is reduced with less need for axial installation space in comparison with loose wheels configured in the conventional manner, and the lifetime of a gearwheel is increase due to the reduced tilting.

REFERENCE CHARACTERS

1 Device
2 Shaft, countershaft
3 Component, loose wheel
3A, B Friction surface
4 Main transmission shaft
5, 6 Gearwheel
7 Loose wheel
8 Actuating element
8A Friction surface
8A to 8F Flank
9 Actuating element
9A to 9F Flank
10 Actuator
11 Actuating rod
12 Holding element
12A, B Region
13 Long slot
14 Connecting area
15 Axis of symmetry
16, 17, 18 Support bodies
19 Retaining element
20 Ring element
20A Groove-shaped recess
21 Shaft collar
21A Friction surface
22 Spring device
23 Shaft collar
24, 25, 26 Spring device

The invention claimed is:

1. A device (1) for fixedly coupling a component (3, 7) to a shaft (2) which supports the component (3, 7), the device comprising:
the component (3, 7) being axially slidable along and freely rotatable on the shaft (2) when uncoupled to the shaft (2);
an actuator (10) communicating with an actuating element (8, 9) which is axially slidably and rotatably coupled to the shaft (2), the actuating element (8, 9) being actuated by the actuator (10) to slide axially on the shaft (2) between a neutral position (SM), a position rotationally fixed to the shaft (2) and a position freely rotatable on the shaft (2);
the actuating element (8, 9) couples the component (3, 7) such that when the actuating element (8, 9) is axially biased from the neutral position (SM) to the position rotationally fixed to the shaft (2), the actuating element (8, 9) couples and axially biases the component (3, 7) such that a pair of frictional surfaces (3A, 3B) of the component (3, 7) frictionally engage a frictional surface (8A) of the actuating element (8, 9) and a frictional surface (21A) of a shaft collar (21) that is fixedly coupled to the shaft (2) so as to reduce a rotational difference between rotation of the component (3, 7) and rotation of the shaft (2);
the actuating element (8, 9) is further axially biased from the position rotationally fixed to the shaft (2) to the position freely rotatable on the shaft (2), in the position freely rotatable on the shaft (2), the actuating element (8, 9) rotates relative to the shaft (2) and abuts at least one support body (16, 17, 18); and
the at least one support body (16, 17, 18) is fixedly coupled to the shaft (2) and has a surface which is angled with respect to a direction of rotation of the shaft (2) such that when the actuating element (8, 9) abuts the at least one support body (16, 17, 18), the angled surface of the at least one support body (16, 17, 18) applies an axially directed actuating force, via the actuating element (8, 9), on the component (3, 7), the axially directed actuating force being dependent on torque transmitted from the shaft (2) to the component (3, 7) and independent of actuation of the actuating element (8, 9) by the actuator (10).

2. The device according to claim 1, wherein the actuating element (8, 9) has at least two flanks (8A to 8F, 9A to 9F), which enclose an angle with a cross sectional plane vertical to an axis of symmetry (15) of the shaft (2), and the support body (16 to 18) abuts at least one of the flanks (8A and 8B, 8C and 8D, 8E and 8F, 9A and 9B, 9C and 9D, 9E and 9F) of the actuating element (8, 9).

3. The device according to claim 1, wherein the actuating element (8, 9) is operatively connected to the actuator (10) via at least one holding element (12) connected to the shaft (2) when in the position rotationally fixed to the shaft (2) and is movable, in relation to the shaft (2), such that the actuating element (8, 9) is frictionally engaged with the component (3, 7) with corresponding actuation by the actuator.

4. The device according to claim 3, wherein the holding element (12), for transferring the actuating element (8, 9) from the position rotationally fixed to the shaft to the position rotatable on the shaft (2), is at least one of axially displaced, radially displaced and twisted by the actuator (10) such that a positive-locking connection, between the holding element (12) and the actuating element (8, 9), is disconnected.

5. The device according to claim 3, wherein relative movement between the actuating element (8, 9) and the holding element (12) is prevented by a tension retaining element (19), and only after a defined actuation force of the actuator (10), is exceeded is the holding element (12) disengaged from the actuating element (8, 9) and the actuating element (8,9) rotatably arranged on the shaft (2), the defined actuation force being equivalent to a spring force affecting the retaining element (19).

6. The device according to claim 1, wherein a positively-locked connection between the actuating element (8, 9) and the support body (16 to 18) has one of a friction bearing and an anti-friction bearing.

7. The device according to claim 1, wherein an electronic control device is provided which detects a difference in rotational speed between the component (3, 7) and the shaft (2).

* * * * *